United States Patent
Dowdle et al.

(10) Patent No.: US 7,250,185 B2
(45) Date of Patent: Jul. 31, 2007

US007250185B2

(54) PROCESS FOR REDUCING THE CONCENTRATION OF UNDESIRED COMPOUNDS IN A COMPOSITION

(75) Inventors: Paul Alan Dowdle, St. Helens (GB); Stuart Corr, Appleton (GB)

(73) Assignee: Ineos Fluor Holdings Limited (GB)

( * ) Notice: Subject to any disclaimer, the term of this patent is extended or adjusted under 35 U.S.C. 154(b) by 187 days.

(21) Appl. No.: 10/415,862

(22) PCT Filed: Nov. 6, 2001

(86) PCT No.: PCT/GB01/04920

§ 371 (c)(1),
(2), (4) Date: Oct. 24, 2003

(87) PCT Pub. No.: WO02/36720

PCT Pub. Date: May 10, 2002

(65) Prior Publication Data

US 2004/0069713 A1   Apr. 15, 2004

(30) Foreign Application Priority Data

Nov. 6, 2000   (GB) ................................. 0027047.0

(51) Int. Cl.
*A23L 1/00* (2006.01)
(52) U.S. Cl. ...................... 426/422; 426/425; 426/428; 423/658.5
(58) Field of Classification Search ................ 426/422, 426/423, 424, 425, 428, 429, 430; 423/658.5
See application file for complete search history.

(56) References Cited

U.S. PATENT DOCUMENTS

| | | |
|---|---|---|
| 2,712,008 A | 6/1955 | Kirchner et al. |
| 3,150,050 A | 9/1964 | Safrin et al. |
| 3,155,523 A | 11/1964 | Reich |
| 3,612,066 A | 10/1971 | Jones |
| 3,649,296 A | 3/1972 | Friedman et al. |
| 3,769,033 A | 10/1973 | Panzer et al. |
| 3,867,262 A | 2/1975 | Rockland et al. |
| 3,914,174 A | 10/1975 | Fuchs |
| 3,928,579 A | 12/1975 | McShane |
| 3,954,678 A | 5/1976 | Marquisee |
| 4,059,604 A | 11/1977 | Kresse |
| 4,177,038 A | 12/1979 | Biebricher et al. |
| 4,353,801 A | 10/1982 | Mukoyama et al. |
| 4,367,178 A | 1/1983 | Heigel et al. |
| 4,522,995 A | 6/1985 | Anderson et al. |
| 4,597,943 A | 7/1986 | Sugiyama et al. |
| 4,673,733 A | 6/1987 | Chandra et al. |
| 4,767,670 A | 8/1988 | Cox et al. |
| 4,787,983 A | 11/1988 | DiFoggio et al. |
| 4,802,986 A | 2/1989 | Hayes, Jr. et al. |
| 4,816,159 A | 3/1989 | Khosah et al. |
| 4,820,044 A | 4/1989 | Crighton et al. |
| 4,826,603 A | 5/1989 | Hayes, Jr. et al. |
| 4,865,741 A | 9/1989 | Nolte et al. |
| 4,985,265 A | 1/1991 | Duboc et al. |
| 5,018,540 A | 5/1991 | Grubbs et al. |
| 5,092,983 A | 3/1992 | Eppig et al. |
| 5,246,588 A | 9/1993 | Tonelli et al. |
| 5,262,057 A | 11/1993 | Tonelli et al. |
| 5,281,732 A | 1/1994 | Franke |
| 5,369,165 A | 11/1994 | Kato et al. |
| 5,405,633 A | 4/1995 | Heidlas et al. |
| 5,481,058 A | 1/1996 | Blackwell et al. |
| 5,512,285 A | 4/1996 | Wilde |
| 5,516,923 A | 5/1996 | Hebert et al. |
| 5,562,857 A | 10/1996 | Werner et al. |
| 5,824,225 A | 10/1998 | Powell et al. |
| 6,224,847 B1 | 5/2001 | Powell et al. |
| 6,746,695 B1 | 6/2004 | Martin et al. |

FOREIGN PATENT DOCUMENTS

| | | |
|---|---|---|
| EP | 0 254 610 B1 | 1/1988 |
| EP | 0 363 971 A2 | 4/1990 |
| EP | 0 538 827 A2 | 4/1993 |
| EP | 0 616 821 A1 | 9/1994 |
| EP | 0616821 A1 * | 9/1994 |
| FR | 1 211 820 | 3/1960 |
| FR | 2 543 155 A1 | 9/1984 |
| GB | 928594 | 6/1963 |
| GB | 1 388 581 | 3/1975 |

(Continued)

OTHER PUBLICATIONS

Suatoni, J. C., et al., "Hydrocarbon Group Types in Gasoline-Range Materials by High Performance Liquid Chromatography," Journal of Chromatographic Science, Aug. 1975 pp. 367-371 vol. 13.

(Continued)

*Primary Examiner*—Leslie Wong
(74) *Attorney, Agent, or Firm*—Cook, Alex, McFarron, Manzo, Cummings & Mehler, Ltd.

(57) ABSTRACT

A process for treating a composition comprising one or more undesired compounds and one or more desired compounds so as to reduce the concentration of the one or more undesired compounds is described. The process comprises the steps of (1) contacting the composition with a solid adsorbent, (2) eluting the solid adsorbent on which the composition is retained with an extraction solvent comprising a (hydro)fluorocarbon, and (3) collecting a solvent eluate containing a composition having a reduced concentration of the undesired compounds from the solid adsorbent. The process is particularly suited to reducing the terpene content of an essential oil.

40 Claims, No Drawings

FOREIGN PATENT DOCUMENTS

| | | |
|---|---|---|
| GB | 1 419 958 | 12/1975 |
| GB | 2 225 205 A | 5/1990 |
| GB | 2 320 025 A | 6/1998 |
| GB | 2 324 050 A | 10/1998 |
| JP | 62 067 036 | 3/1987 |
| SU | 1002350 | 3/1983 |
| SU | 1557154 A1 | 4/1990 |
| WO | WO 94/20486 | 9/1994 |
| WO | WO 95/26794 | 10/1995 |
| WO | WO 95/29003 | 11/1995 |
| WO | WO 98/45013 | 10/1998 |
| WO | WO 99/59607 | 11/1999 |
| WO | WO 00/64555 | 11/2000 |
| WO | WO 00/72861 A1 | 12/2000 |
| WO | PCT/GB01/04920 | 2/2002 |
| WO | PCT/GB01/04920 | 9/2002 |

OTHER PUBLICATIONS

Bodgoll, B., "Perfluoroalkanes as Eluents in Liquid Chromatography," Abstract No. 92: 29057j, Chemical Abstracts, vol. 92, No. 4, Jan. 1980.

O'Brien, Anthony P., "Studies of Methods for Hydrocarbon Type Analysis of Gasolines," The Analyst, Jun. 1985, pp. 593-597, vol. 110, No. 6.

Jones, Meirion, "In Search of Safe CFC's," New Scientist, May 26, 1988, pp. 56-60.

"Potential Substitutes to Chlorofluorocarbons as Aerosol Propellants," Product Literature from ICI Chemicals & Polymers, 1989.

Dalby, Richard N., et al., "CFC Propellant Substitution: P-134a as a Potential Replacement for P-12 in MDIs," Pharmaceutical Technology, Mar. 1990, pp. 29-33.

Bruno, T.J., et al., "Retention of halocarbons on a hexafluoropropylene epoxide modified graphitized carbon black," Journal of Chromatography, vol. 672, Jun. 1994, pp. 149-158.

UK High Court Judgement: Riker Laboratories Inc. and Minnesota Mining & Manufacturing Co. Patents, Jun. 23, 1997.

EPO Decision T 0379/96-3.3.2, Jan. 13, 1999.

Bogdoll, B., et al., "Perfluoralkanes as Eluents in Liquid Chrom.," Fresenius, Z. Anal. Chem., 1979, 298(5), pp. 349-357.

* cited by examiner

PROCESS FOR REDUCING THE CONCENTRATION OF UNDESIRED COMPOUNDS IN A COMPOSITION

CROSS REFERENCE TO RELATED APPLICATIONS

This application is a national stage application based upon International Application No. PCT/GB01/04920, which claims priority from Great Britain Application No. GB 0027047.0, filed Nov. 6, 2000.

This invention relates to a process for reducing the concentration of one or more undesired compounds in a composition containing those compounds and one or more desired compounds. More particularly, the present invention relates to a process for reducing the concentration of undesired compounds in a flavour and/or fragrance composition comprising those compounds and one or more desired flavour and/or fragrance compounds. In particular, the present invention relates to a process for reducing the terpene content of a composition, such as an essential oil, containing one or more terpenes and one or more desired flavour and/or fragrance compounds (hereinafter referred to collectively as organoleptic compounds).

Essential oils are typically extracted or expressed from plant materials and are used for flavouring, fragrance and medicinal purposes. These oils typically contain quantities of undesirable compounds, particularly terpenes, and the desired organoleptic compounds, which can be structurally related to the terpenes, but carry heteroatom functionality, e.g. oxygen containing functional groups such as hydroxyl, carbonyl or ether groups. One particular class of organoleptic compounds contained in essential oils is the terpenoids. These compounds carry oxygen functionality and are structurally related to the terpenes.

The terpenoid content of essential oils often contributes significantly to the desired organoleptic properties of the essential oil. For example, the aroma and flavour of citrus peel oils is largely determined by the presence of citral (an aldehyde), nerol and geraniol (alcohols) and their ethyl esters.

However, the terpenes are often present in large quantities in essential oils and tend to dilute or mask the desirable properties of the organoleptic compounds. For example, citrus peel oils typically contain between 90% and 98% terpenes, primarily $\alpha$-limonene, and $\alpha$- and $\beta$-pinene. Rosemary oil also typically contains between 85% and 90% terpenes and celery seed oil between 80% and 85%.

It is, therefore, desirable to reduce the level of terpenes in essential oils to provide an oil that is enriched in the desired organoleptic compounds, such as the terpenoids, to yield an oil having improved organoleptic properties. These enriched oils are known in the art as "terpeneless", although the term is a misnomer in that the majority of terpeneless oils still contain substantial quantities of terpenes. However, the important characteristic of terpeneless oils is that they contain higher quantities of the compounds, such as the terpenoids, which contribute to the desired organoleptic properties of the essential oil. For example, typical terpeneless citrus oils contain between 5 and 20 times the concentration of the desirable terpenoid compounds as compared to the essential oil starting material. This concentration enhancement is referred to as "folding", and an oil having a 5-times enhancement is referred to as a "5-fold oil".

Terpeneless oils, including citrus peel oil (orange, lemon, lime, grapefruit, bergamot) amongst others, have been available commercially for some time and are valuable materials in the flavours and fragrance areas.

The reduction of the terpene content, or deterpenation of essential oils has conventionally been achieved using techniques such as distillation or liquid solvent extraction.

Since essential oils often contain a large number of volatile or thermally unstable compounds, distillation is often conducted under reduced pressure in order to minimise the detrimental effects of high temperature on the quality of the product.

Terpeneless oils derived from solvent extraction processes often provide superior organoleptic performance to those derived from distillation. Typically, the process involves contacting the essential oil starting material with a solvent, such as ethanol or a water-ethanol mixture, in a countercurrent liquid-liquid partition process.

One drawback of solvent extraction is the requirement to remove the solvent from the final product, and with conventional extraction processes this will often mean recovering or disposing of relatively large volumes of used solvent. Moreover, the solvents used in known extraction processes often have relatively high boiling points so that removal of the solvent from the essential oil by distillation can result in loss of product, either through co-evaporation of the more volatile compounds with the extraction solvent or thermal degradation of the more thermally unstable compounds.

Both supercritical carbon dioxide ($scCO_2$) and ternary $scCO_2$-ethanol-water mixtures have been used as solvents for deterpenation. High pressures and relatively high $scCO_2$/oil ratios are required in order to achieve satisfactory levels of deterpenation. This results in high equipment costs. The $scCO_2$/oil ratio required can be decreased but only at the expense of operating at higher temperatures (>70° C.) with an increased risk of detrimental thermal effects on product quality.

Adsorptive methods of deterpenation have also been examined.

For example, stepwise desorption of lemon peel oil from a polar adsorbent using increasing $scCO_2$ pressure has been investigated (J. of Supercritical Fluids, 1994, 7, 177). This method resulted in several fractions, some of which were enriched in the desired terpenoids. However, the method suffers from the disadvantage of having to be operated at high pressures.

Elution of adsorbed citrus oil from silica gel with petroleum ether/ethyl acetate or n-hexane/ethyl acetate to remove the terpenes, followed by ethyl acetate to recover a terpenoid-rich fraction has also been examined (Flavour and Fragrance Journal, 5, 57 (1990)). However, one problem with these methods is that they use large volumes of flammable solvents.

The present invention provides a new process for reducing the concentration of one or more undesired compounds in a composition containing those compounds and one or more desired compounds.

According to the present invention there is provided a process for treating a composition comprising one or more undesired compounds and one or more desired compounds so as to reduce the concentration of one or more of the undesired compounds, which process comprises the steps of (1) contacting the composition with a solid adsorbent, (2) eluting the solid adsorbent on which the composition is adsorbed with an extraction solvent comprising a (hydro) fluorocarbon, and (3) collecting a solvent eluate containing a composition having a reduced concentration of the undesired compounds from the solid adsorbent.

In the process of the present invention, it is often the case that the desired compounds are polar, e.g. by virtue of carrying oxygen containing functional groups, while the undesired compounds are non-polar. This is true, for example, of essential oils in which the unwanted terpenes are non-polar, while the desired organoleptic compounds, such as the oxygen containing terpenoids, are polar. As a result, by using a polar adsorbent it is possible to adsorb the desired compounds more strongly or even preferentially as a result of their polar character. In fact, it has been found that a proportion of the undesired non-polar compounds may not be even adsorbed by the adsorbent and instead will occupy the voids or interstices between the adsorbent particles.

This stronger or preferential adsorption of the polar compounds will allow the undesired non-polar compounds to be more readily removed from the polar adsorbent with a solvent. The solvent which is used to remove at least a proportion of the undesired non-polar compounds from the adsorbent may be a (hydro)fluorocarbon solvent of the type which is used to elute the adsorbent to recover a composition containing a reduced concentration of those undesired compounds. Alternatively, however, the adsorbent could be first eluted with a non-polar or substantially non-polar solvent, such as hexane, petroleum ether or a mixture of one or both of these compounds with a small quantity (typically less than 10 weight %) of a polar compound, prior to being eluted with the (hydro)fluorocarbon, in order to remove at least a proportion of the undesired non-polar compounds. The prior treatment with a non-polar solvent is particularly advantageous when the mixture of the adsorbent and the composition to be treated contains undesired compounds held in the voids between the adsorbent particles.

In a preferred embodiment, the composition which is treated in the process of the present invention is a flavour and/or fragrance composition comprising one or more undesired compounds and one or more desired flavour and/or fragrance compounds having desired organoleptic properties.

More particularly, the present invention provides a process for reducing the terpene content of a composition, such as an essential oil, an oleoresin or a concrete, especially an essential oil, which contains one or more terpenes as a constituent part.

Accordingly, in a preferred embodiment the present invention provides a process for reducing the terpene content of a composition containing one or more terpenes and one or more desired compounds as constituent parts, which process comprises the steps of (1) contacting the composition with a polar, solid adsorbent, (2) eluting the polar, solid adsorbent on which the composition is adsorbed with an extraction solvent comprising a (hydro)fluorocarbon, and (3) collecting a solvent eluate containing a composition of reduced terpene content from the polar, solid adsorbent.

In this preferred embodiment, the terpene containing composition that is subjected to the process is preferably a flavour and/or fragrance composition containing one or more desired flavour and/or fragrance compounds in addition to the terpenes. More preferably, the terpene containing composition is an essential oil.

By reducing the level of terpenes in essential oils, the process of the present invention can provide essential oils that are enriched with the more desirable flavour and/or fragrance compounds, such as the oxygen containing terpenoids.

When the composition which is subjected to the present process is a terpene containing flavour and/or fragrance composition, a polar adsorbent will have a greater affinity for the polar flavour and/or fragrance compounds contained in that composition than for the non-polar terpenes. As a result, the desirable organoleptic compounds are adsorbed more strongly or even preferentially. In fact, it has been found that a proportion of the unwanted terpenes may not be even adsorbed by the adsorbent and instead will occupy the voids or interstices between the adsorbent particles.

This stronger or preferential adsorption of the desired organoleptic compounds will allow the unwanted terpenes to be more readily removed from the polar adsorbent with a solvent. The solvent which is used to remove at least a proportion of the terpenes from the adsorbent may be a (hydro)fluorocarbon solvent of the type which is used to elute the adsorbent to recover a composition containing a reduced concentration of the terpenes. Alternatively, however, the adsorbent could be first eluted with a non-polar or substantially non-polar solvent, such as hexane, petroleum ether or a mixture of one or both of these compounds with a small quantity (typically less than 10 weight %) of a polar compound, prior to being eluted with the (hydro)fluorocarbon, in order to remove at least a proportion of the unwanted terpenes. The prior treatment with a non-polar solvent is particularly advantageous when the mixture of the adsorbent and the composition to be treated contains unwanted terpenes held in the voids between the adsorbent particles.

According to a further aspect of the present invention, there is provided an essential oil having a reduced terpene content obtainable using the process of the present invention.

By the term "essential oil" we include oils which are extracted or expressed from plant materials and which contain, inter alia, one or more terpenes and one or more desired organoleptic compounds, such as the oxygen containing terpenoids. Suitable essential oils which may be extracted in accordance with the process of the present invention include citrus peel oils, such as orange, lemon, lime, grapefruit and bergamot, peppermint oil, lavandin oil, rosemary oil, ginger oil and celery seed oil.

When the process of the present invention is applied to an essential oil, that oil may be an unrefined oil obtained directly from a plant material containing that oil. Alternatively, the essential oil obtained from a plant may be subjected to one or more pre-treatment or refining steps before being subjected to the process of the present invention.

The composition to be treated in the process of the present invention may be dissolved or dispersed in a solvent before it is brought into contact with the adsorbent in order to facilitate the adsorption. For example, if the composition is a viscous essential oil, adsorption of that oil on the adsorbent can be facilitated by dissolving the oil in a suitable non-polar solvent. If desired, the composition to be treated can be charged to a column as a solution or dispersion in the (hydro)fluorocarbon containing solvent which is to be used to elute the adsorbent.

The solid adsorbent is usually a polar material, is preferably in particulate form and is normally packed in a column to form a bed to which the composition to be treated, e.g. an essential oil, optionally dissolved in a suitable solvent, and then the (hydro)fluorocarbon containing eluting solvent are conveyed. The solvent entrains or dissolves the composition to be treated and carries it through the column, specifically through the adsorbent material packing the column. As the (hydro)fluorocarbon solvent is passed through the adsorbent, the different affinities that the desired compounds have for the adsorbent compared to the undesired compounds, e.g. as a result of different polarities, allows for at least partial separation of these compounds. As a result, a fraction can be collected from the column which contains a composition, such as a terpeneless essential oil, that is enriched in the desired compounds.

Although the solvent may be allowed to pass passively through the packed column under the action of gravity, it is preferred to forcibly drive the solvent through the column using a pump or some other means to create a positive (super-atmospheric) pressure at the inlet end of the column. The flow of solvent through the column is continued at least until the desired product has been eluted from the column.

In an alternative embodiment, the composition to be treated, optionally dissolved in a suitable solvent, can be charged to the adsorbent bed and the bed then eluted with a non-polar or substantially non-polar solvent, such as hexane, petroleum ether or a mixture of one or both of these compounds with a small quantity (typically less than 10 weight %) of a polar compound in order to remove at least a proportion of the undesired non-polar compounds from the adsorbent. The prior treatment with a non-polar solvent is particularly advantageous when the adsorbent bed contains undesired compounds held in the voids between the adsorbent particles. When this treatment has been completed, the adsorbent can either be retained in the column and the bed treated with the (hydro)fluorocarbon solvent, or it can be removed from the column and then treated with the (hydro)fluorocarbon solvent.

Suitable polar adsorbents for use in the present process include, inter alia, activated alumina, aluminum hydroxide, silica gel, silicic acid and cellulose. The preferred adsorbent will depend, inter alia, on the nature of the composition which is being processed. However, silica gels and silicic acid and basic or weakly acidic activated aluminas have been found to be particularly effective adsorbents when treating essential oils. In order to minimise the possibility of undesirable isomerisation and hydrolytic processes, the activated and partially-deactivated silica gel and silicic acid adsorbents are particularly useful.

The solvent which is used in the process of the present invention contains at least one (hydro)fluorocarbon. By the term "(hydro)fluorocarbon" we mean a compound selected from the group consisting of the hydrofluorocarbons and the perfluorocarbons. By the term "hydrofluorocarbon" we mean a compound which contains only carbon, hydrogen and fluorine atoms.

The solvent should, of course, be in liquid form. Where the solvent comprises one or more low boiling compounds which are gases at room temperature, the required liquid form may be attained by cooling the solvent to a suitably low temperature or by subjecting it to super-atmospheric pressures at some point before it is contacted with the adsorbent.

Suitable perfluorocarbons include hexafluoroethane (R-116) and octafluoropropane (R-218).

Suitable hydrofluorocarbons include the hydrofluoromethanes, the hydrofluoroethanes and the hydrofluoropropanes, such as trifluoromethane (R-23), fluoromethane (R-41), difluoromethane (R-32), pentafluoroethane (R-125), 1,1,1-trifluoroethane (R-143a), 1,1,2,2-tetrafluoroethane (R-134), 1,1,1,2-tetrafluoroethane (R-134a), 1,1-difluoroethane (R-152a), 1,1,1,3,3-pentafluoropropane (R-245fa), 1,1,2,2,3-pentafluoropropane (R-245ca), 1,1,1,2,3-pentafluoropropane (R-245eb), 1,1,2,3,3-pentafluoropropane (R-245ea), 1,1,1,2,3,3-hexafluoropropane (R-236ea), 1,1,1,2,2,3-hexafluoropropane (R-236cb), 1,1,1,3,3,3-hexafluoropropane (R-236fa), 1,1,1,2,3,3,3-heptafluoropropane (R-227ea) and 1,1,1,2,2,3,3-heptafluoropropane (R-227ca). Particularly preferred hydrofluorocarbons include R-134a, R-245fa, R-236ea and R-227ea, especially R-134a.

Solvents containing mixtures of two or more (hydro)fluorocarbons may be used if desired.

The extraction solvent which is used in the process of the present invention may also comprise a co-solvent in addition to the (hydro)fluorocarbon.

Suitable co-solvents include, inter alia, fluorine free and more particularly halogen free compounds. Suitable halogen free co-solvents will typically have a boiling point of 80° C. or below, for example in the range of from −85 to 80° C. The preferred co-solvents have a boiling point of 60° C. or below, for example in the range of from −85 to 60° C., preferably 20° C. or below, for example in the range of from −70 to 20° C., and more preferably 10° C. or below, for example in the range of from −60 to 10° C. Mixtures of two or more co-solvents may be used if desired.

Suitable co-solvents may be selected from the $C_{2-6}$, particularly the $C_{2-4}$ hydrocarbon compounds by which we mean compounds containing only carbon and hydrogen atoms. Suitable hydrocarbons may be aliphatic or alicyclic. Preferred hydrocarbons are the alkanes and cycloalkanes, with alkanes such as ethane, n-propane, i-propane, n-butane and i-butane being especially preferred.

Other suitable co-solvents include the hydrocarbon ethers, by which we mean compounds having the formula $R^1$—O—$R^2$ in which $R^1$ and $R^2$ are independently hydrocarbyl groups containing only carbon and hydrogen atoms, such as $C_{1-6}$ and preferably $C_{1-3}$ alkyl groups. Preferred dialkyl ethers include dimethyl ether, methyl ethyl ether and diethyl ether.

Still further suitable co-solvents may be selected from the amides, sulphoxides, alcohols, ketones, carboxylic acids, carboxylic acid derivatives, inorganic acids and nitro compounds.

Preferred amide co-solvents include the N,N'-dialkylamides and alkylamides, especially dimethylformamide and formamide.

Preferred sulphoxide co-solvents include the dialkylsulphoxides, especially dimethylsulphoxide.

Preferred alcohol co-solvents include the aliphatic alcohols, particularly the alkanols. Preferred alkanols are selected from the $C_{1-6}$, particularly the $C_{1-3}$ alkanols, with methanol, ethanol, 1-propanol and 2-propanol being especially preferred.

Preferred ketone co-solvents include the aliphatic ketones, particularly the dialkyl ketones. A particularly preferred dialkyl ketone is acetone.

Preferred carboxylic acid co-solvents include formic acid and acetic acid.

Preferred carboxylic acid derivatives for use as co-solvents include the anhydrides, especially acetic anhydride, and the $C_{1-6}$, particularly the $C_{1-3}$ alkyl esters of $C_{1-6}$, particularly $C_{1-3}$ alkanoic acids, especially ethyl acetate.

Preferred nitro compounds for use as co-solvents include the nitroalkanes and nitroaryl compounds, with nitromethane and nitrobenzene being especially preferred.

The extraction solvent typically comprises from 50.0 to 100% by weight, e.g. from 50.0 to 99.5% by weight, of a (hydro)fluorocarbon and from 0 to 50% by weight, e.g. from 0.5 to 50% by weight, of a co-solvent. Preferred extraction solvents comprise from 70.0 to 100.0% by weight, e.g. from 70.0 to 99.0% by weight, of the (hydro)fluorocarbon and from 0 to 30% by weight, e.g. from 1 to 30% by weight, of the co-solvent. Particularly preferred extraction solvents comprise from 80.0 to 100.0% by weight, e.g. from 80.0 to 99.0% by weight, of the (hydro)fluorocarbon and from 0 to 20.0% by weight, e.g. from 1.0 to 20.0% by weight, of the co-solvent.

In common with conventional chromatography practice, the composition of the solvent blend can be varied during the course of a run to enhance the resolution of the separation.

If the co-solvent is a flammable material, which will be the case with the hydrocarbon, hydrocarbon ether and alkanol co-solvents identified above, then the extraction solvent will preferably comprise sufficient of a non-flammable (hydro)fluorocarbon to render the solvent non-flammable overall. Where the extraction solvent is a blend of one or more compounds, the resulting blend may be zeotropic, azeotropic or azeotrope-like.

The preferred extraction solvents comprise only low boiling compounds so that removal of the solvent from the eluate containing the desired composition tends to be relatively facile and can be accomplished by flash evaporation or distillation at relatively low temperatures, e.g. room temperature and below. This, in turn, reduces the risk of loosing desired product either through co-evaporation of the more volatile compounds with the extraction solvent or thermal degradation of the more thermally unstable compounds.

The weight ratio of the composition to be treated to the adsorbent in the process of the present invention is typically in the range of from 20:1 to 1:2, preferably in the range of from 10:1 to 1:1 and particularly in the range of from 4:1 to 1:1. The optimum ratio depends, inter alia, on the nature of the composition to be treated. For a terpene containing flavour or fragrance composition, the optimum ratio depends particularly on the terpene content.

The process of the present invention is usually conducted at a temperature in the range of from −10 to 80° C. This includes the initial adsorption step, in which the composition to be treated is charged to the adsorbent, as well as the elution step with the (hydro)fluorocarbon containing solvent. Operating temperatures at or below ambient, e.g. in the range of from −10 to 30° C., are particularly preferred.

The process of the present invention may be conducted at atmospheric, sub-atmospheric or super-atmospheric pressures. The precise operating pressure will depend, inter alia, on the extraction solvent which is used, particularly its boiling point. Preferred operating pressures are in the range of from 0.1 to 200 bar, more preferably in the range of from 0.5 to 30 bar and particularly in the range of from 1 to 15 bar. When the adsorbent is packed into a column, the process is preferably operated at elevated pressures to drive the solvent through the column.

When the process of the present invention is conducted on a column, as is preferred, and the composition to be treated is an oil, such as an essential oil, the step of charging the oil to the column is preferably followed by passing air or an inert gas such as nitrogen through the adsorbent bed in order to reduce the quantity of interstitial oil, i.e. oil which is held in the gaps between the particles of adsorbent making up the adsorbent bed, but which is not adsorbed by the adsorbent. As stated above, the removal of at least some of the interstitial oil can also be effected by washing the adsorbent bed with a non-polar or substantially non-polar solvent, such as hexane, petroleum ether or a mixture of one or both of these compounds with a small quantity (typically<10% by weight) of a polar compound. Suitable polar compounds include the amides, sulphoxides, alcohols, ketones, carboxylic acids, carboxylic acid derivatives, inorganic acids and nitro compounds mentioned above.

Where a solvent is used to remove the interstitial oil, it will preferably be used in an amount of up to 10% of the volume of the adsorbent bed.

The gas and solvent treatments to remove interstitial oil can both be used, e.g. the solvent treatment could be conducted prior to the gas treatment.

The eluate containing the desired composition, such as an essential oil of reduced terpene content, which is obtained in the process of the present invention is preferably subjected to a filtration step in order to separate it from any adsorbent which becomes entrained in the solvent. The extraction solvent may be removed from the desired composition by distillation or by flash evaporation.

The composition which is finally obtained from the process of the present invention may be used as it is or, alternatively, it may be subjected to one or more further processes, for example to purify the composition further or to isolate a given constituent or constituents contained in the composition.

It should also be appreciated that a composition to be treated may be subjected to the process of the present invention more than one time in order to reduce the content of undesired compounds still further and produce a product that is richer in the desired compounds.

Preferably, the deterpenated essential oil provided by the process of the present invention has a terpenoid and other oxygenates enrichment of greater than 5-fold, preferably greater than 10 fold. The process of the invention may allow up to 50 fold oils to be obtained depending on the initial terpene content of the raw material.

The apparatus which is used to carry out the process of the present invention may employ a solvent recovery system which removes the solvent from the eluate recovered from the adsorbent by evaporation and then condenses the resulting solvent vapour for reuse.

A suitable recovery system for low boiling point solvents, by which we mean solvents having a boiling point of 25° C., or below, e.g. 0° C. or below, comprises an evaporator into which the eluate emerging from the process is passed, a compressor for compressing the vapour generated in the evaporator and a condenser for cooling the compressed vapour emerging from the compressor. The solvent is removed from the eluate in the evaporator by flash evaporation induced by suction from the compressor and the solvent vapour so generated then passes to the compressor, which may be a diaphragm compressor, where it is compressed. From the compressor, the solvent vapour passes to the condenser where it is cooled and returned to liquid form for recharging to the process or possibly to a solvent reservoir supplying solvent to the process. The condenser, which may take the form of a coiled tube, can be arranged inside the evaporator so that the latent heat of condensation provides at least some of the energy required to evaporate the solvent, the remainder being supplied by the work done by the compressor.

A further suitable recovery system for low boiling point solvents comprises a solvent recycling circuit comprising an evaporator into which the eluate emerging from the process is passed and in which the solvent is evaporated and a condenser in which the vapour emerging from the evaporator is cooled and returned to liquid form for recharging to the process or possibly to a solvent reservoir supplying solvent to the process. Heating of the evaporator and cooling of the condenser may be carried out independently, but in a preferred embodiment an external heat pump system is used to both heat the evaporator and to cool the condenser. The external heat pump system comprises an evaporator, a compressor, a condenser and an expansion valve which are sequentially arranged in a circuit through which a heat transfer fluid is caused to flow. The evaporator of the external heat pump system, which may take the form of a coiled tube, is arranged inside or around the outside of the condenser of the solvent recycling circuit so that evaporation of the heat transfer fluid in the evaporator cools the condenser and provides for the condensation of the solvent vapour passing through the solvent recycling circuit. The vapour generated in the evaporator of the external heat pump system is then compressed and passes to the condenser where it condenses and gives off heat. The condenser of the external heat pump system, which may also take the form of a coiled tube, is arranged inside or around the outside of the evaporator of the solvent recycling circuit so that the latent heat of condensation associated with the condensation of the heat transfer fluid provides the heat required to evaporate the solvent passing through the solvent recycling circuit. The condensed heat transfer fluid is then returned through an expansion valve to the evaporator so completing the cycle in the external heat pump system.

As an alternative to an external heat pump system, an external circulating heat-transfer fluid may be used to transfer the heat of solvent condensation to the evaporator vessel to provide heat for solvent evaporation.

The process of the present invention may be operated in a, batch, batch continuous or continuous fashion.

The adsorbent which is used in the present invention may be regenerated following use by drying at elevated temperature under a stream of air or nitrogen, followed by any desired activity control treatment such as exposure to a controlled humidity environment. The adsorbent may also be treated with water prior to the drying process. Suitable drying temperatures are in the range 80° C. to 600° C., more preferably 100° C. to 500° C. and most preferably 100° C. to 200° C. Methods of adsorbent regeneration are well-known to those skilled in the art.

The present invention is now illustrated but not limited by the following examples.

General Procedure A:

A glass chromatography column was dry packed with 30 g of a selected adsorbent. 80 g of cold pressed lemon oil or cold pressed orange oil was charged to the top of the column and allowed to run through the column under the action of gravity until the discharge of oil from the bottom of the column stopped. Approximately 15 ml of hexane was then passed through the column under the action of gravity followed by a forced nitrogen flow to displace interstitial oil that was not removed by the hexane, and the hexane itself. The flow of nitrogen through the column was continued until no further liquid could be seen exiting the bottom of the columns. When the flow of liquid had stopped, the solid adsorbent was removed from the column and transferred to a cellulose soxhlet extraction thimble. The thimble was placed in a glass soxhlet extractor and a receiver flask attached in position on the extractor. The extractor was then placed in an autoclave, equipped with a cold finger condenser and a heating coil, and the autoclave was sealed and evacuated. Approximately 300 g of solvent (either 1,1,1,2-tetrafluoroethane (R-134a) or 1,1,1,2,3,3,3-heptafluoropropane (R-227ea)) was transferred from a cylinder into the autoclave via a ball valve which was then resealed. The transfer of solvent into the autoclave raised the pressure to approximately 80 psi. This pressure was maintained during the extraction. The condenser and heating coil temperatures were then set at about 10° C. and 40° C. respectively and the extraction allowed to proceed for about 2 hours. The solvent refluxes within the soxhlet extractor and solvent condensing on the cold finger drops through the contents of the thimble and into the receiver flask.

On completion of the extraction, the solvent was reclaimed by opening the ball valve and condensing the solvent into a cooled Whitey Bomb. The autoclave was then opened and the soxhlet extractor retrieved. The receiver flask containing the deterpenated oil fraction was then detached and a sample of the oil sent for analysis.

The oils were analysed before and after the extraction process by gas chromatography (GC) to determine their composition. The gas chromatogram was a Perkin-Elmer AutoSystem XT with flame ionised detection (FID) and mass spectrometric (MS) detection. The machine was equipped with a CIP-SIL 8 column of 50 m length, 0.38 mm internal diameter and 5 μm film thickness. During the analysis, the column temperature was initially set at 200° C. and held at this temperature for 60 minutes. The column temperature was then raised at 10° C./minute to 220° C. and held at this temperature for 28 minutes.

General Procedure B:

A stainless steel, cylindrical extraction vessel was dry packed with 2 kg of a selected adsorbent. 5 kg of cold-pressed orange oil, cold-pressed lemon oil or cold-pressed grapefruit oil was charged to the top of the vessel and allowed to run through the vessel under the action of gravity over a period of around 1 hour until the discharge of oil from the bottom of the vessel stopped. Liquid 1,1,1,2-tetrafluoroethane solvent at a temperature of about 20° C. and at autogeneous pressure was then continuously charged to the vessel at a flow rate of about 200 kg/hour. The 1,1,1,2-tetrafluoroethane solvent containing the extracted material was passed to an evaporator where the 1,1,1,2-tetrafluoroethane was flash evaporated to leave the extract behind. The evaporator was drained periodically to obtain individual cuts of the extract. The 1,1,1,2-tetrafluoroethane vapour generated in the evaporator was recycled. The vapour was first compressed and then condensed to return it to the liquid state for recharging to the extraction vessel. This continuous process was continued until the adsorbent failed to yield any further product.

The oils were analysed before and after the extraction process by gas chromatography (GC) to determine their composition as described above for General Procedure A.

EXAMPLES 1 to 5

Lemon Oil Extraction with R-134a

General procedure A described above was used to extract an oil fraction having a reduced concentration of terpenes and an increased concentration of the desired organoleptic compounds (i.e. the terpenoids and other oxygenates) from cold pressed lemon oil. The lemon oil initially contained 97.53 weight % of the terpenes, 1.87 weight % of the desired oxygenated organoleptic compounds and 0.6 weight % of sesquiterpine hydrocarbons. The solvent used in all the examples was R-134a. The adsorbents used in each example were as follows:

Example 1: Acidic alumina (Brockman Activity I, 150 mesh particles)

Example 2: Weakly acidic alumina (Brockman Activity I, 150 mesh particles).

Example 3: Neutral alumina (Brockman Activity I, 150 mesh particles)

Example 4: Basic alumina (Brockman Activity I, 150 mesh particles)

Example 5: Silica gel (Grade 22, 60–200 mesh particles)

The compositions of the oil fractions collected in each example are given below.

Example 1: The oil fraction collected at the end of the process comprised 75.39 weight % of the terpenes, 24.21 weight % of the desired oxygenated organoleptic compounds and 0.4 weight % of sesquiterpine hydrocarbons.

Example 2: The oil fraction collected at the end of the process comprised 90.39 weight % of the terpenes, 9.38 weight % of the desired oxygenated organoleptic compounds and 0.23 weight % of sesquiterpine hydrocarbons.

Example 3: The oil fraction collected at the end of the process comprised 95.32 weight % of the terpenes, 4.12 weight % of the desired oxygenated organoleptic compounds and 0.56 weight % of sesquiterpine hydrocarbons.

Example 4: The oil fraction collected at the end of the process comprised 89.01 weight % of the terpenes, 10.90 weight % of the desired oxygenated organoleptic compounds and 0.09 weight % of sesquiterpine hydrocarbons.

Example 5: The oil fraction collected at the end of the process comprised 88.40 weight % of the terpenes, 11.05 weight % of the desired oxygenated organoleptic compounds and 0.55 weight % of sesquiterpine hydrocarbons.

EXAMPLE 6 to 10

Lemon Oil Extraction with R-227ea

General procedure A described above was used to extract an oil fraction having a reduced concentration of terpenes and an increased concentration of the desired organoleptic compounds (i.e. the terpenoids and other oxygenates) from cold pressed lemon oil. The lemon oil initially contained 97.53 weight % of the terpenes, 1.87 weight % of the desired oxygenated organoleptic compounds and 0.6 weight % of sesquiterpine hydrocarbons. The solvent used in all the examples was R-227ea. The adsorbents used in each example were as follows:

Example 6: Acidic alumina (Brockman Activity I, 150 mesh particles)

Example 7: Weakly acidic alumina (Brockman Activity I, 150 mesh particles).

Example 8: Neutral alumina (Brockman Activity I, 150 mesh particles)

Example 9: Basic alumina (Brockman Activity I, 150 mesh particles).

Example 10: Silica gel (Grade 22, 60–200 mesh particles)

The compositions of the oil fractions collected in each example are given below.

Example 6: The oil fraction collected at the end of the process comprised 84.87 weight % of the terpenes, 15.08 weight % of the desired oxygenated organoleptic compounds and 0.05 weight % of sesquiterpine hydrocarbons.

Example 7: The oil fraction collected at the end of the process comprised 89.21 weight % of the terpenes, 10.73 weight % of the desired oxygenated organoleptic compounds and 0.06 weight % of sesquiterpine hydrocarbons.

Example 8: The oil fraction collected at the end of the process comprised 80.43 weight % of the terpenes, 19.20 weight % of the desired oxygenated organoleptic compounds and 0.38 weight % of sesquiterpine hydrocarbons.

Example 9: The oil fraction collected at the end of the process comprised 96.95 weight % of the terpenes, 2.28 weight % of the desired oxygenated organoleptic compounds and 0.77 weight % of sesquiterpine hydrocarbons.

Example 10: The oil fraction collected at the end of the process comprised 85.64 weight % of the terpenes, 13.60 weight % of the desired oxygenated organoleptic compounds and 0.76 weight % of sesquiterpine hydrocarbons.

EXAMPLES 11 to 14

Orange Oil Extraction with R-134a

General procedure A described above was used to extract an oil fraction having a reduced concentration of terpenes and an increased concentration of the desired organoleptic compounds (i.e. the terpenoids and other oxygenates) from cold pressed orange oil. The orange oil initially contained 96.46 weight % of the terpenes, 3.44 weight % of the desired oxygenated organoleptic compounds and 0.11 weight % of sesquiterpine hydrocarbons. The solvent used in all the examples was R-134a. The adsorbents used in each example were as follows:

Example 11: Weakly acidic alumina (Brockman Activity I, 150 mesh particles).

Example 12: Neutral alumina,(Brockman Activity I, 150 mesh particles)

Example 13: Basic alumina (Brockman Activity I, 150 mesh particles)

Example 14: Silica gel (Grade 22, 60–200 mesh particles)

The compositions of the oil fractions collected in each example are given below.

Example 11: The oil fraction collected at the end of the process comprised 82.47 weight % of the terpenes, 17.53 weight % of the oxygenated organoleptic compounds and 0.00 weight % of sesquiterpine hydrocarbons.

Example 12: The oil fraction collected at the end of the process comprised 87.56 weight % of the terpenes, 12.34 weight % of the oxygenated organoleptic compounds and 0.10 weight % of sesquiterpine hydrocarbons.

Example 13: The oil fraction collected at the end of the process comprised 85.99 weight % of the terpenes, 14.00 weight % of the oxygenated organoleptic compounds and 0.01 weight % of sesquiterpine hydrocarbons.

Example 14: The oil fraction collected at the end of the process comprised 62.35 weight % of the terpenes, 37.57 weight % of the oxygenated organoleptic compounds and 0.08 weight % of sesquiterpine hydrocarbons.

EXAMPLES 15 to 19

Orange Oil Extraction with R-227ea

General procedure A described above was used to extract an oil fraction having a reduced concentration of terpenes and an increased concentration of the desired organoleptic compounds (i.e. the terpenoids and other oxygenates) from cold pressed orange oil. The orange oil initially contained 96.46 weight % of the terpenes, 3.44 weight % of the desired oxygenated organoleptic compounds and 0.11 weight % of sesquiterpine hydrocarbons. The solvent used in all the examples was R-227ea. The adsorbents used in each example were as follows:

Example 15: Acidic alumina (Brockman Activity I, 150 mesh particles)

Example 16: Weakly acidic alumina (Brockman Activity I, 150 mesh particles).

Example 17: Neutral alumina (Brockman Activity I, 150 mesh particles).

Example 18: Basic alumina (Brockman Activity I, 150 mesh particles)

Example 19: Silica gel (Grade 22, 60–200 mesh particles)

The compositions of the oil fractions collected in each example are given below.

Example 15: The oil fraction collected at the end of the process comprised 67.06 weight % of the terpenes, 32.89 weight % of the desired oxygenated organoleptic compounds and 0.05 weight % of sesquiterpine hydrocarbons.

Example 16: The oil fraction collected at the end of the process comprised 85.90 weight % of the terpenes, 14.10 weight % of the desired oxygenated organoleptic compounds and 0.00 weight % of sesquiterpine hydrocarbons.

Example 17: The oil fraction collected at the end of the process comprised 87.02 weight % of the terpenes, 12.88 weight % of the desired oxygenated organoleptic compounds and 0.10 weight % of sesquiterpine hydrocarbons.

Example 18: The oil fraction collected at the end of the process comprised 89.35 weight % of the terpenes, 10.65 weight % of the desired oxygenated organoleptic compounds and 0.00 weight % of sesquiterpine hydrocarbons.

Example 19: The oil fraction collected at the end of the process comprised 88.55 weight % of the terpenes, 11.41 weight % of the desired oxygenated organoleptic compounds and 0.04 weight % of sesquiterpine hydrocarbons.

EXAMPLE 20

Orange Oil Extraction

General procedure B described above was used to extract an oil fraction having a reduced concentration of terpenes and an increased concentration of the desired organoleptic compounds (i.e. the terpenoids and other oxygenates) from cold pressed Brazilian orange oil. The orange oil initially contained approximately 1% by weight oxygenates. The adsorbent used was silica gel (Ineos Silica Sorbsil AQ; 0.2 to 1 mm particle size).

Four cuts were collected. The first cut was recovered after approximately 10 minutes of solvent flow. The remaining three cuts were recovered over a period of three to four hours.

The compositions of the oil fractions collected in each cut were as follows:

Cut 1: Yield of 14.4% by weight (based on the original oil mass) and containing 0.9% by weight oxygenates. Consisted principally of interstitial oil and desorbed terpenes.

Cut 2: Yield of 3.6% by weight (based on the original oil mass) and containing 18% by weight oxygenates.

Cut 3: Yield of 1.4% by weight (based on the original oil mass) and containing 24% by weight oxygenates.

Cut 4: Yield of 1.8% by weight (based on the original oil mass) and containing 34% by weight oxygenates.

EXAMPLE 21

Orange Oil Extraction

General procedure B described above was used to extract an oil fraction having a reduced concentration of terpenes and an increased concentration of the desired organoleptic compounds (i.e. the terpenoids and other oxygenates) from 8-fold Brazilian orange oil. The orange oil initially contained approximately 7% by weight oxygenates. The adsorbent used was silica gel (Ineos Silica Sorbsil AQ; 0.2 to 1 mm particle size).

Four cuts were collected. The first cut was recovered after approximately 10 minutes of solvent flow. The remaining three cuts were recovered over a period of three to four hours.

The compositions of the oil fractions collected in each cut were as follows:

Cut 1: Yield of 11.0% by weight (based on the original oil mass) and containing 3.4% by weight oxygenates. Consisted principally of interstitial oil and desorbed terpenes.

Cut 2: Yield of 0.8% by weight (based on the original oil mass) and containing 22% by weight oxygenates.

Cut 3: Yield of 1.4% by weight (based on the original oil mass) and containing 54% by weight oxygenates.

Cut 4: Yield of 0.6% by weight (based on the original oil mass) and containing 75% by weight oxygenates.

EXAMPLE 22

Lemon Oil Extraction

General procedure B described above was used to extract an oil fraction having a reduced concentration of terpenes and an increased concentration of the desired organoleptic compounds (i.e. the terpenoids and other oxygenates) from cold pressed blended Sicilian lemon oil. The lemon oil initially contained approximately 1% by weight oxygenates. The adsorbent used was silica gel (Ineos Silica Sorbsil AQ; 0.2 to 1 mm particle size).

Five cuts were collected. The first cut was recovered after approximately 10 minutes of solvent flow. The remaining four cuts were recovered over a period of three to four hours.

The compositions of the oil fractions collected in each cut were as follows:

Cut 1: Yield of 16.0% by weight (based on the original oil mass) and containing 1.0% by weight oxygenates. Consisted principally of interstitial oil and desorbed terpenes.

Cut 2: Yield of 2.0% by weight (based on the original oil mass) and containing 7.6% by weight oxygenates.

Cut 3: Yield of 0.8% by weight (based on the original oil mass) and containing 30.0% by weight oxygenates.

Cut 4: Yield of 0.4% by weight (based on the original oil mass) and containing 46.0% by weight oxygenates.

Cut 5: Yield of 0.7% by weight (based on the original oil mass) and containing 69.0% by weight oxygenates.

EXAMPLE 23

Grapefruit Oil Extraction

General procedure B described above was used to extract an oil fraction having a reduced concentration of terpenes and an increased concentration of the desired organoleptic compounds (i.e. the terpenoids and other oxygenates) from cold pressed white Californian grapefruit oil. The adsorbent used was silica gel (Ineos Silica Sorbsil AQ; 0.2 to 1 mm particle size).

Four cuts were collected. The first cut was recovered after approximately 10 minutes of solvent flow. The remaining three cuts were recovered over a period of three to four hours.

The compositions of the oil fractions collected in each cut were as follows:

Cut 1: Yield of 14.0% by weight (based on the original oil mass) and containing 4.0% by weight oxygenates. Consisted principally of interstitial oil and desorbed terpenes.

Cut 2: Yield of 2.0% by weight (based on the original oil mass) and containing 16.0% by weight oxygenates.

Cut 3: Yield of 0.9% by weight (based on the original oil mass) and containing 14.0% by weight oxygenates.

Cut 4: Yield of 0.6% by weight (based on the original oil mass) and containing 30.0% by weight oxygenates.

The invention claimed is:
1. A process for treating a composition obtained from a plant material comprising one or more undesired compounds and one or more desired compounds so as to reduce the concentration of one or more of the undesired compounds, which process comprises the steps of (1) contacting the composition with a solid adsorbent, (2) eluting the solid adsorbent on which the composition is retained with an extraction solvent comprising a liquid hydrofluorocarbon, and (3) collecting a solvent eluate of the liquid hydrofluorocarbon containing a composition having a reduced concentration of the undesired compounds from the solid adsorbent.
2. A process as claimed in claim 1, wherein the adsorbent is polar.
3. A process as claimed in claim 2, wherein the one or more desired compounds are polar and the one or more undesired compounds are non-polar.
4. A process as claimed in claim 1, wherein the composition to be treated is a flavour and/or fragrance composition comprising one or more desired flavour and/or fragrance compounds.
5. A process as claimed in claim 1, wherein the composition to be treated is an essential oil and undesired compounds comprise one or more terpenes.
6. A process for reducing the terpene content of a composition containing one or more terpenes and one or more desired compounds as constituent parts, which process comprises the steps of (1) contacting the composition with a polar, solid adsorbent, (2) eluting the polar, solid adsorbent on which the composition is retained with an extraction solvent comprising a liquid hydrofluorocarbon, and (3) collecting a solvent eluate of the liquid hydrofluorocarbon containing a composition of reduced terpene content from the polar, solid adsorbent.
7. A process as claimed in claim 6, wherein the composition to be treated is an essential oil, an oleoresin or a concrete.
8. A process as claimed in claim 1, wherein the adsorbent is in particulate fonn.
9. A process as claimed in claim 1, wherein the adsorbent is packed in a column forming a bed to which the composition to be treated is charged.
10. A process as claimed in claim 9 further comprising the step of passing air or an inert gas through the adsorbent bed on which the composition to be treated is retained.
11. A process as claimed in claim 9 further comprising the step of passing a non-polar solvent through the adsorbent bed on which the composition to be treated is retained.
12. A process as claimed in claim 10 further comprising the step of passing a non-polar solvent through the adsorbent bed on which the composition to be treated is retained prior to the air or inert gas.
13. A process as claimed in claim 11, wherein the non-polar solvent is selected from hexane and petroleum ether.
14. A process as claimed in claim 1, wherein the adsorbent is selected from the group consisting of activated alumina, aluminium hydroxide, silica gel, silicic acid and cellulose.
15. A process as claimed in claim 14, wherein the adsorbent is a silica gel or silicic acid.
16. A process as claimed in claim 1, wherein the extraction solvent comprises at least one hydrofluorocarbon selected from the hydrofluoromethanes, the hydrofluoroethanes and the hydrofluoropropanes.
17. A process as claimed in claim 16, wherein the extraction solvent comprises at least one hydrofluorocarbon selected from the group consisting of trifluoromethane(R-23), fluoromethane (R-41),difluoromethane (R-32), pentafluoroethane (R-125), 1,1,1-trifluoroethane (R-143a), 1,1,2,2-tetrafluoroethane (R-134), 1,1,1,2-tetrafluoroethane (R-134a), 1,1-difluoroethane (R-152a), 1,1,1,3,3-pentafluoropropane (R-245fa), 1,1,2,2,3-pentafluoropropane (R-245ca), 1,1,1,2,3-pentafluoropropane (R-245eb), 1,1,2,3,3-pentafluoropropane (R-245ea), 1,1,1,2,3,3-hexafluoropropane (R-236ea), 1,1,1,2,2,3-hexafluoropropane (R-236cb), 1,1,1,3,3,3-hexafluoropropane (R-236fa), 1,1,1,2,3,3,3-heptafluoropropane (R-227ea) and 1,1,1,2,2,3,3-heptafluoropropane (R-227ca).
18. A process as claimed in claim 17, wherein the extraction solvent comprises at least one compound selected from 1,1,1,2-tetrafluoroethane (R-134a), 1,1,1,3,3-pentafluoropropane (R-245fa), 1,1,1,2,3,3-hexafluoropropane (R-236ea) and 1,1,1,2,3,3,3-heptafluoropropane (R-227ea).
19. A process as claimed in claim 18, wherein the extraction solvent comprises 1,1,1,2-tetrafluoroethane (R-134a).
20. A process as claimed in claim 1, wherein the extraction solvent comprises a co-solvent in addition to the hydrofluorocarbon.
21. A process as claimed in claim 20 wherein the co-solvent is halogen free.
22. A process as claimed in claim 1, wherein the ratio of the composition to be treated to the adsorbent is in the range of from 20:1 to 1:2.
23. A process as claimed in claim 1 which is conducted at a temperature in the range of from −10 to 80° C.
24. A process as claimed in claim 1 which is conducted at a pressure in the range of from 0.1 to 200 bar.
25. A process for treating a composition of an essential oil, an oleoresin or a concrete comprising one or more undesired compounds and one or more desired compounds so as to reduce the concentration of one or more of the undesired compounds, which process comprises the steps of (1) contacting the composition with a solid adsorbent, (2) eluting the solid adsorbent on which the composition is retained with an extraction solvent comprising a liquid hydrofluorocarbon, and (3) collecting a solvent eluate of the liquid hydrofluorocarbon containing a composition having a reduced concentration of the undesired compounds from the solid adsorbent.
26. A process as claimed in claim 25, wherein the adsorbent is polar.
27. A process as claimed in claim 26, wherein the one or more desired compounds are polar and the one or more undesired compounds are non-polar.
28. A process as claimed in claim 25, wherein the composition to be treated is a flavour and/or fragrance composition comprising one or more desired flavour and/or fragrance compounds.
29. a process as claimed in claim 25, wherein the undesired compounds comprise one or more terpenes.
30. A process as claimed in claim 25, wherein the composition which is treated is unrefined and obtained directly from a plant material containing that composition.
31. A process as claimed in claim 25, wherein the composition which is treated has been obtained from a plant material containing that composition and has been subjected to at least one pre-treatment step prior to being subjected to the process set forth in claim 25.
32. A process for treating a composition obtained from a plant material comprising one or more undesired compounds and one or more desired compounds so as to reduce the concentration of one or more of the undesired compounds, which process comprises the steps of (1) contacting the composition with a solid adsorbent, (2) eluting the solid adsorbent on which the composition is retained with an extraction solvent comprising a liquid hydrofluorocarbon, (3) collecting a solvent eluate of the liquid hydrofluorocarbon containing a composition having an increased concentration of the undesired compounds from the solid adsorbent; (4) continuing to elute the solid adsorbent on which the composition is retained with an extraction solvent comprising a liquid hydrofluorocarbon, and (5) collecting the solvent eluate obtained from step 4 containing a composition having a reduced concentration of the undesired compounds from the solid adsorbent.

33. A process as claimed in claim 32, wherein the adsorbent is polar.

34. A process as claimed in claim 33, wherein the one or more desired compounds are polar and the one or more undesired compounds are non-polar.

35. A process as claimed in claim 32, wherein the composition to be treated is a flavour and/or fragrance compo sition comprising one or more desired flavour and/or fragrance compounds.

36. A process as claimed in claim 32, wherein the composition to be treated is an essential oil, an oleoresin or a concrete.

37. A process as claimed in claim 32, wherein the undesired compounds comprise one or more terpenes.

38. The process as claimed in claim 32, wherein the composition which is treated is unrefined and obtained directly from a plant material containing that composition.

39. A process as claimed in claim 32, wherein the composition which is treated has been subjected to at least one pre-treatment step prior to being subjected to the process set forth in claim 32.

40. A process as claimed in claim 32, wherein the liquid hydrofluorocarbon in steps 2 through 5 is the same liquid hydrofluorocarbon.

\* \* \* \* \*